(12) United States Patent
Kane et al.

(10) Patent No.: US 8,361,644 B2
(45) Date of Patent: Jan. 29, 2013

(54) BATTERY MODULE COMPOSED OF FLEXIBLE BATTERY CELLS AND CELL INTERCONNECT STRUCTURE THEREFOR

(75) Inventors: James E. Kane, Waterford, MI (US); Larry L. Deal, Shelby Township, MI (US); Ronald Gritzinger, Sterling Heights, MI (US)

(73) Assignee: Magna Electronics Inc., Holly, MI (US)

( * ) Notice: Subject to any disclaimer, the term of this patent is extended or adjusted under 35 U.S.C. 154(b) by 416 days.

(21) Appl. No.: 12/712,294

(22) Filed: Feb. 25, 2010

(65) Prior Publication Data

US 2010/0216007 A1    Aug. 26, 2010

Related U.S. Application Data

(60) Provisional application No. 61/155,652, filed on Feb. 26, 2009.

(51) Int. Cl.
*H01M 10/50* (2006.01)
*H01M 6/42* (2006.01)
*H01M 6/46* (2006.01)
*H01M 2/24* (2006.01)

(52) U.S. Cl. ........ 429/153; 429/120; 429/149; 429/152; 429/158; 429/160

(58) Field of Classification Search ............... 429/120, 429/149, 152, 153, 158, 160
See application file for complete search history.

(56) References Cited

U.S. PATENT DOCUMENTS

2006/0246350 A1* 11/2006 Takayama et al. ............ 429/178

* cited by examiner

*Primary Examiner* — Eugenia Wang
(74) *Attorney, Agent, or Firm* — Millman IP

(57) ABSTRACT

An interconnect device enables battery cells having terminals in the form of flexible tabs to be serially interconnected in a stack. The interconnect device comprises a relatively rigid substrate and at least two arrays of pins projecting from opposing first and second surfaces of the substrate. This enables the flexible tabs of the battery cell to be embedded in the pin arrays, providing a quick and easy means of fixing the tabs and enabling them to be interconnected to other cells in a stacked arrangement. A battery module formed from such a stack of cell assemblies is also disclosed.

17 Claims, 10 Drawing Sheets

BATTERY MODULE COMPOSED OF FLEXIBLE BATTERY CELLS AND CELL INTERCONNECT STRUCTURE THEREFOR

This application claims the benefits of U.S. Provisional Application No. 61/155,652, filed Feb. 26, 2009.

FIELD OF THE INVENTION

The invention relates generally to the field of batteries, and more particularly to battery modules formed from a plurality of battery cells.

BACKGROUND OF THE INVENTION

The invention relates generally to the field of batteries, and more particularly to battery modules formed from a plurality of battery cells.

SUMMARY OF THE INVENTION

According to a broad aspect of the invention, a cell interconnect device is provided for enabling battery cells having terminals in the form of flexible tabs to be serially interconnected in a stack. The interconnect device comprises a relatively rigid substrate and at least two arrays of pins projecting from opposing first and second surfaces of the substrate. This enables the flexible tabs of the battery cell to be embedded in the pin arrays, providing a quick and easy means of fixing the tabs and enabling them to be interconnected to other cells in a stacked arrangement.

According to another aspect of the invention, a battery cell assembly is provided. The assembly includes a battery cell having positive and negative terminals and a flexible packaging. The packaging includes a fringe area where the packaging is sealed. The fringe area has a first and an opposing second side, and the positive and negative terminals are in the form of flexible tabs emanating from the fringe area between the first and second sides thereof. An interconnect device including a non-electrically conductive relatively rigid substrate is disposed about the fringe area. The substrate incorporates a first conductive trace adjacent the first side of the flexible packaging and a second conductive trace adjacent the second side of the flexible packaging. The first conductive trace terminates in a first array of pins projecting from the substrate away from the first side of the flexible packaging and the second conductive trace terminates in a second array of pins projecting from the substrate away from the second side of the flexible packaging. The substrate also includes at least one opening for passage of the tabs therethrough. Utilizing the interconnect device, the positive tab is embedded in one of the first and second pin arrays and the negative tab is embedded in the other of the first and second pin arrays.

Preferably, the first conductive trace also terminates in a third array of pins projecting from the substrate away from the first side of the flexible packaging and the second conductive trace also terminates in a fourth array of pins projecting from the substrate away from the second side of the flexible packaging. The positive tab may be connected to one of (i) either the first or third pin arrays, and (ii) either of the second or fourth pin arrays, and the negative tab may be connected to the other of (i) and (ii).

Preferably the substrate sandwiches the fringe area of the packaging, and even more preferably the substrate substantially surrounds the fringe area of the packaging. Also, the positions of the pins in the first and second pin arrays are preferably offset from one another.

According to another aspect of the invention, a battery module is provided. The module includes a housing and a plurality of cell assemblies disposed in the housing in a stacked arrangement. Each cell assembly includes a battery cell having positive and negative terminals and a flexible packaging. The packaging includes a fringe area where the packaging is sealed, and the fringe area has a first and an opposing second side. The positive and negative terminals are in the form of flexible tabs emanating from the fringe area between the first and second sides thereof. An interconnect device including a non-electrically conductive relatively rigid substrate is disposed about the fringe area. The substrate incorporates a first conductive trace adjacent the first side of the flexible packaging and a second conductive trace adjacent the second side of the flexible packaging. The first conductive trace terminates in a first array of pins projecting from the substrate away from the first side of the flexible packaging and the second conductive trace terminates in a second array of pins projecting from the substrate away from the second side of the flexible packaging. The substrate also includes at least one opening for passage of the tabs therethrough. The positive tab is embedded in one of the first and second pin arrays and the negative tab is embedded in the other of the first and second pin arrays. The cell assemblies are serially connected together such that the positive tab from a given cell assembly in the midst of the stack electrically contacts the negative tab of a first neighboring cell assembly and the negative tab from the given cell assembly electrically contacts the positive tab of a second neighboring cell assembly. Terminals mounted on the housing, the terminals being respectively electrically connected to at least one positive tab and one negative tab in the stack.

The first conductive trace preferably also terminates in a third array of pins projecting from the substrate away from the first side of the flexible packaging and the second conductive trace preferably also terminates in a fourth array of pins projecting from the substrate away from the second side of the flexible packaging. In this case, the positive tab of the given cell assembly may be connected to one of: (i) either the first or third pin arrays, and (ii) either of the second or fourth pin arrays, and the negative tab may be connected to the other of (i) and (ii).

Preferably, the housing includes at least one coolant chamber and an inlet and outlet thereto for circulation of coolant. And the stack preferably includes heat conductive bodies such as trays inserted in between the cell assemblies that contacting the housing and cooling chambers thereof.

A spring loaded plate is also preferably mounted in the housing to compress the stack, the stack being expandable in the housing by applying pressure of expansion against the plate. The plate inhibits separation of the stack as a result of the jerkiness experienced by a road-going vehicle.

BRIEF DESCRIPTION OF THE DRAWINGS

The present invention will now be described by way of example only with reference to the attached drawings, in which:

FIG. 3A is an axonometric view of another cell assembly, intended to be serially connected with the cell assembly shown in FIG. 3;

DETAILED DESCRIPTION OF THE INVENTION

Figure 1:
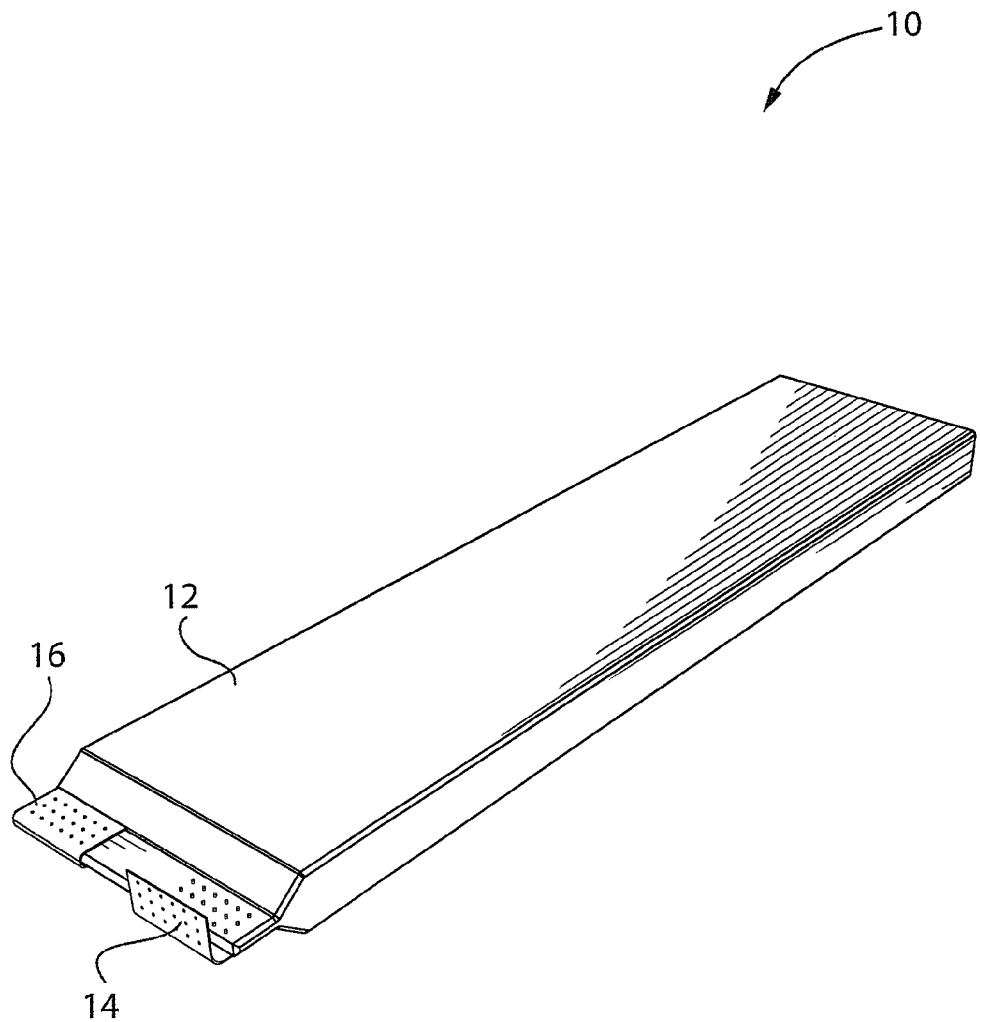
FIG. 1 is an axonometric view of the prior art flexible lithium polymer battery cell.
Figure 2:
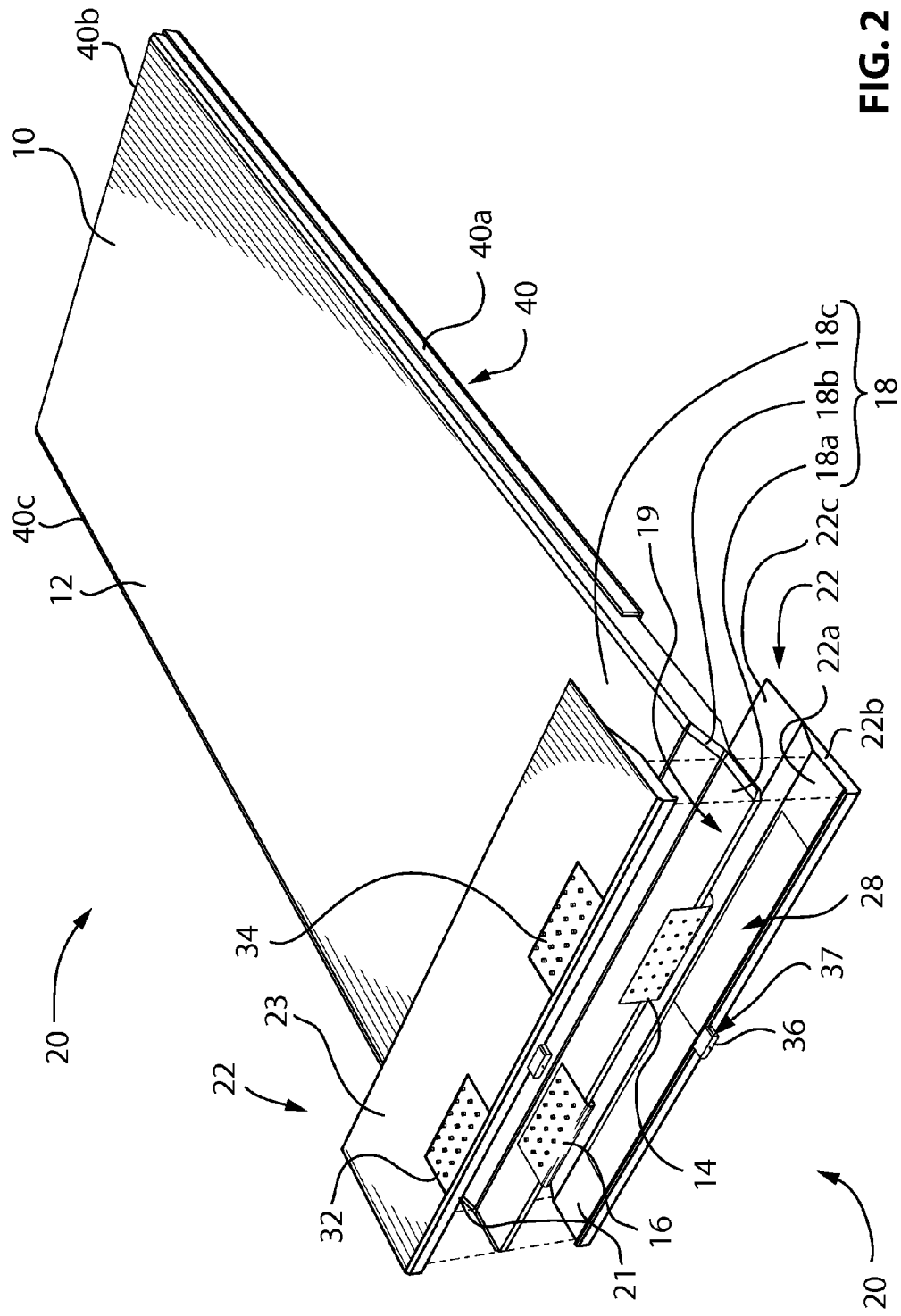
FIG. 2 is an exploded axonometric view of a cell assembly according to a preferred embodiment of the invention.

FIG. 2 shows an exploded axonometric view of a cell assembly 20 according to a preferred embodiment of the invention. The cell assembly 20 includes the cell 10, which features the flexible tabs 14,16 that emanate from a helm 19 of the cell 10 where the flexible packaging 12 is sealed to prevent the leakage of its contents. The helm 19 forms part of a fringe area 18 of the cell 10, which comprises a relatively thin planar-like region 18a incorporating the helm 19. The relatively thin planar-like region 18a flows into a relatively thicker slab portion 18c via a concave or tapered transition portion 18b. The slab portion 18c constitutes the bulk of the cell 10. It should be noted here that, because of its flexibility, the cell 10 may not present these exact shapes in use, but the packing 12 is generally cut, or there is sufficiently excess and loose material, to allow the packaging 12 to achieve such shapes in the fringe area 18.

Referring additionally to the assembly view of FIG. 3, the cell assembly 20 includes an electrical interconnect 21 which is attached to the cell 10 as discussed in greater detail below. The interconnect 21 is composed of two substantially identical connector halves 22, 22' arranged in a mirrored orientation. One side of connector 22 (or 22') features a flat surface 23, and the opposing side of the connector 22 (or 22') has a more complex shape featuring a rectangular bulbous portion 22a that flows into a thinner strip 22c via a convex or tapered transition portion 22b. These portions of the connector 22 (or 22') are shaped to correspondingly mate with the fringe area 18 of the cell 10 so that, when the interconnect 21 is installed, the cell assembly 20 has a substantially uniform thickness d1 generally equivalent to the thickness of the slab portion 18c of the cell 10.

Each connector 22 (or 22') has a non-conductive substrate, such as provided by plastic. The substrate is over-molded with a conductive trace 28 (shown in stippled lines). The trace 28 terminates in two groups of pins 32, 34 that project from the flat surface 23 of the connector 22 (or 22') opposite the rectangular bulbous portion 22a thereof. In addition, each trace 28 also terminates in a pin 36 (seen best in FIG. 3) that is exposed at a projection 37 formed in the connector 22 (or 22').

Figure 3:
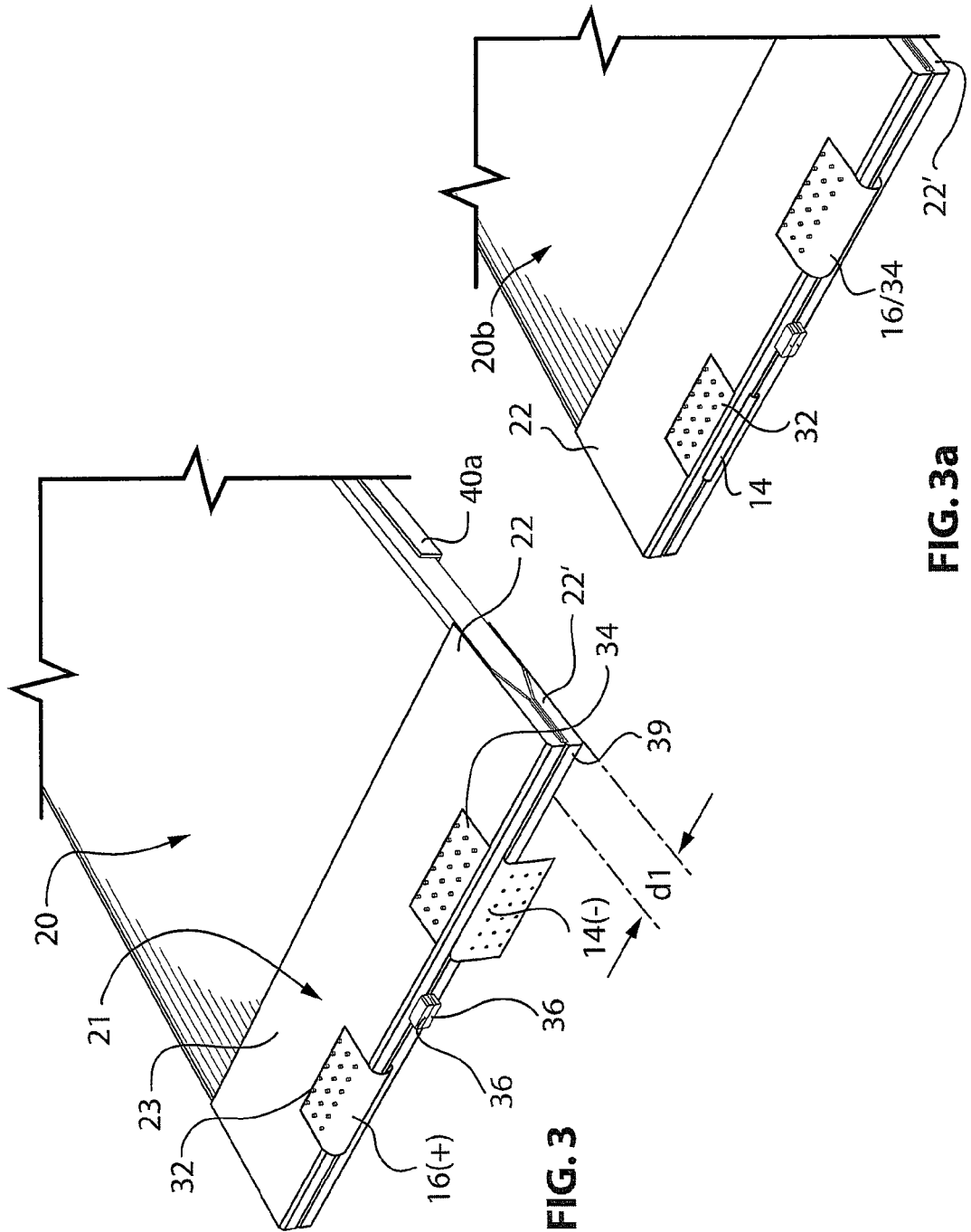
FIG. 3 is an axonometric view of the cell assembly.
Figure 4:
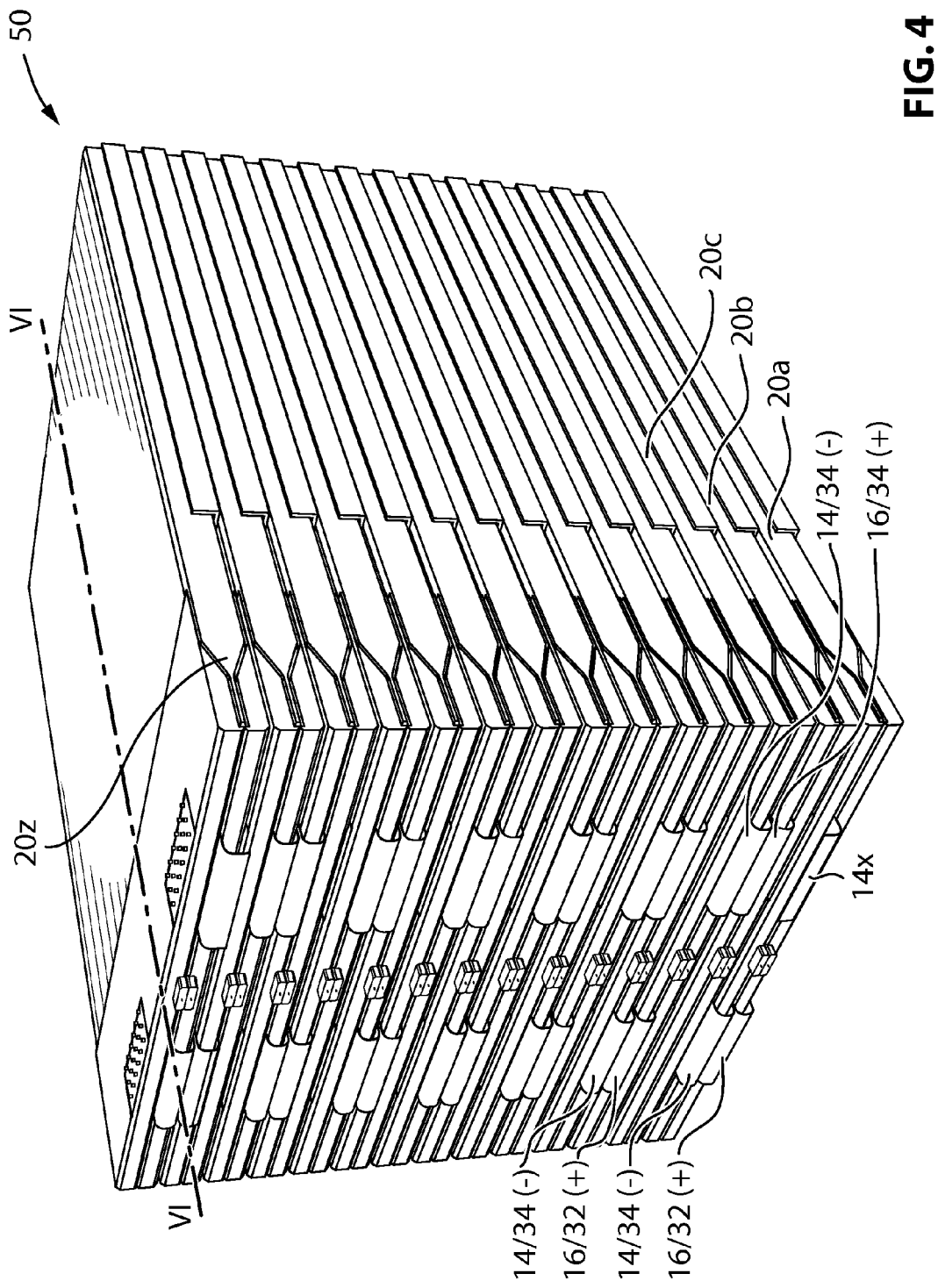
FIG. 4 is an axonometric view of a stack of cell assemblies.

Each connector 22 (or 22') also features a small front lip 39 (seen best in FIG. 3). The conductive, flexible tabs 14, 16 of the cell 10 are brought out of the interconnect 21 in one ore more openings between the lips 39. The two connector halves 22, 22' may be adhesively bonded to the fringe portion 18 of the cell 18 to form the complete interconnect structure 21. Additionally or alternatively, the lips 39 may provide a snap fit to attach the two connector halves 22, 22' together.

The cell assembly 20 also includes a shallow, preferably non-electrically conductive but heat conductive tray 40. The tray include three short sidewalls 40a, 40b, 40c, disposed remote from the interconnect 21. The cell 10 is seated in the tray 40. The cell 10 may be loosely disposed in the tray 40 or adhesively bonded thereto.

To form an electrical connection to the interconnect 21, one tab 16 is folded in first direction over lip 39 to contact pins 32 on one of the connector halves 22. The pins 32 are embedded in and may pierce the tab 16. The pins 32 have a footprint sized to accept the breadth of the tab 16, to ensure maximum conductivity. The other tab 14 is folded over lip 39 in a second direction, opposite the first direction, to contact and be embedded in and/or pierced by the pins 34 on the other connector half 22'. The pins 34 also have a footprint sized to accept the breadth of the tab 14, to ensure maximum conductivity. Thus, in the particular example illustrated in FIG. 3, tab 16/pins 32 of the top connector 22 functions as a positive cell terminal, and tab 14/pins 34 of the bottom connector 22' functions as a negative cell terminal. The remaining pins 34 on the top connector half 22 and the pins 34 on the bottom connector half 22' are not deployed in the illustrated cell 20, but are deployed in adjacent cell assemblies as discussed next.

The pins 32, 34 thus provide a quick and easy means to fix the tabs 14, 16, and the interconnect substrate provides a stable platform for interconnecting other cell assemblies.

Referring additionally to FIGS. 3A and 4-6, a plurality of cell assemblies 20 may be serially connected together to form a stack 50. Starting from a first cell assembly 20A, which is orientated as shown in FIG. 3, the next immediately adjacent cell assembly 20B in the stack 50 is rotated 180 degrees (tray 40 excepted), with its positive tab 16 folded over pins 34 of connector 22 and its negative tab 14 folded over pins 34 of connector 22' (seen best in FIG. 3A). As seen best in FIG. 4, the second cell assembly 20B is connected to the first cell assembly 20A such that the positive tabs/pins 16/32 of the first cell assembly 20A contact the negative tab/pins 14/34 of the second cell assembly 20A. A third cell assembly 20C is orientated similar to the first cell assembly 20A, and is electrically connected to the second assembly 20B. Accordingly, the positive tabs/pins 16/34 of the second cell assembly 20B contacts the negative tabs/pins 14/34 of the third cell assembly 20C. A fourth cell assembly 20D is orientated similar to the first cell assembly 20A, and thus it will be apparent that the pattern of alternating cell orientations and tab folds continues in order to serially connect each of the cell assemblies 20 in the stack 50.

One tab 14X on the bottom-most cell assembly 20A and one tab 16 on the top-most cell assembly 20Z in the stack 50 is not connected to any pins, but is brought out to function as leads into the stack 50, as discussed in greater detail below.

Figure 5:
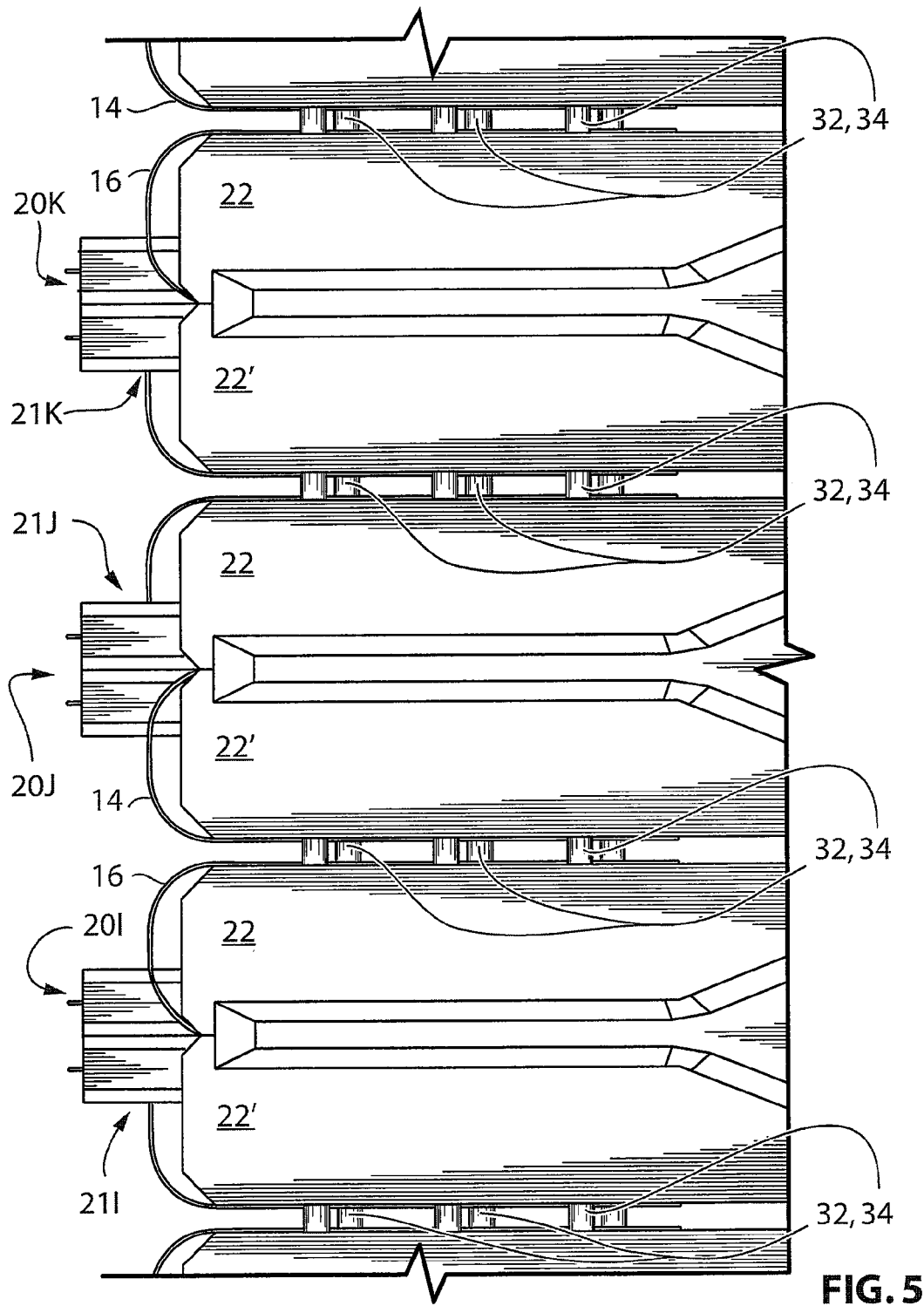
FIG. 5 is a detail end view of a portion of the stack.
Figure 6:
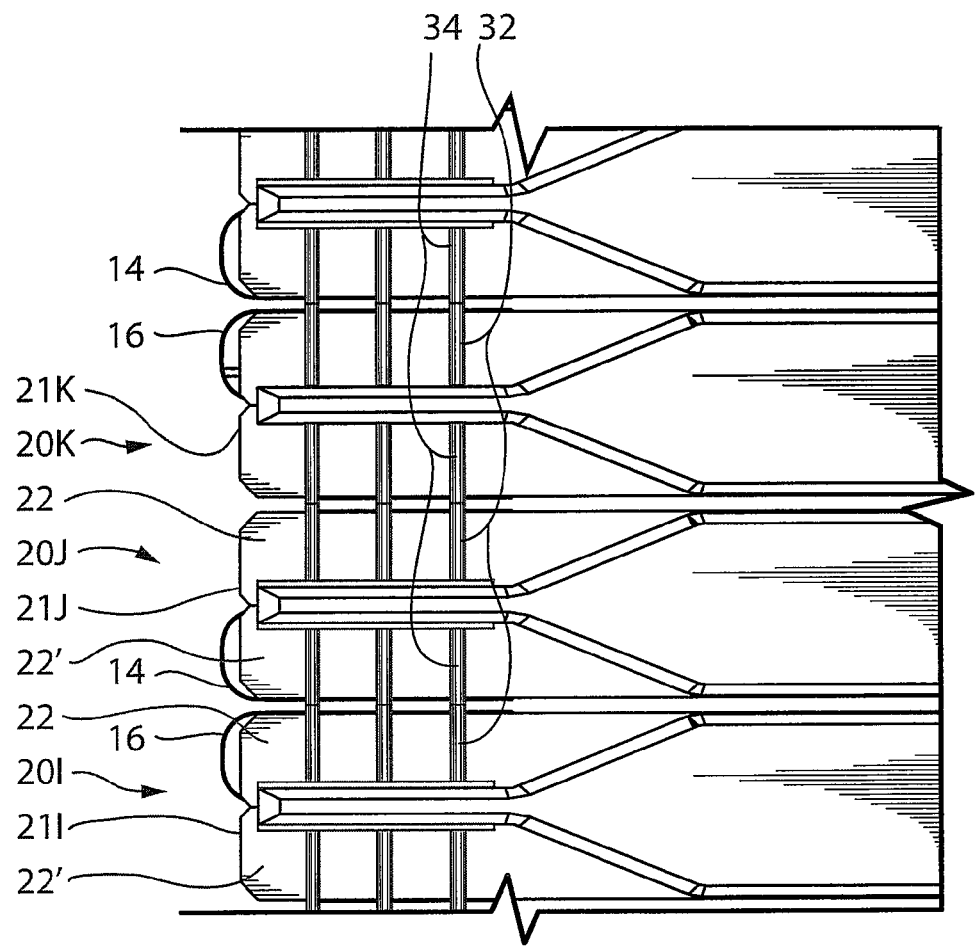
FIG. 6 is a detail cross-sectional view of a portion of the stack, taken along line VI-VI in FIG. 4.

Referring particularly to the detail end and cross-sectional views of FIGS. 5 and 6, it will be seen that the pins 32 of cell assembly 20I also pierce the tab 14 of the immediately adjacent cell assembly 20J and embed into the substrate of its interconnect 21J. Similarly, the pins 34 of cell assembly 20J pierce the tab 16 of cell assembly 20I and embed into the substrate of its interconnect 21I. In this manner, good electrical contact can be made, and a physical interlock may be accomplished between adjacent cell assemblies. However, this could cause a short circuit problem where two interconnects 21J and 21K abut one another in an interface that is not intended to have an conductive connections, such as between cell assembly 20J and 20K. For this reason, the arrays of the pins 32 and 34 on each connector half 22 (or 22') are preferably offset from one another to prevent accidental pin to pin contact where it is not desired.

Figure 7:
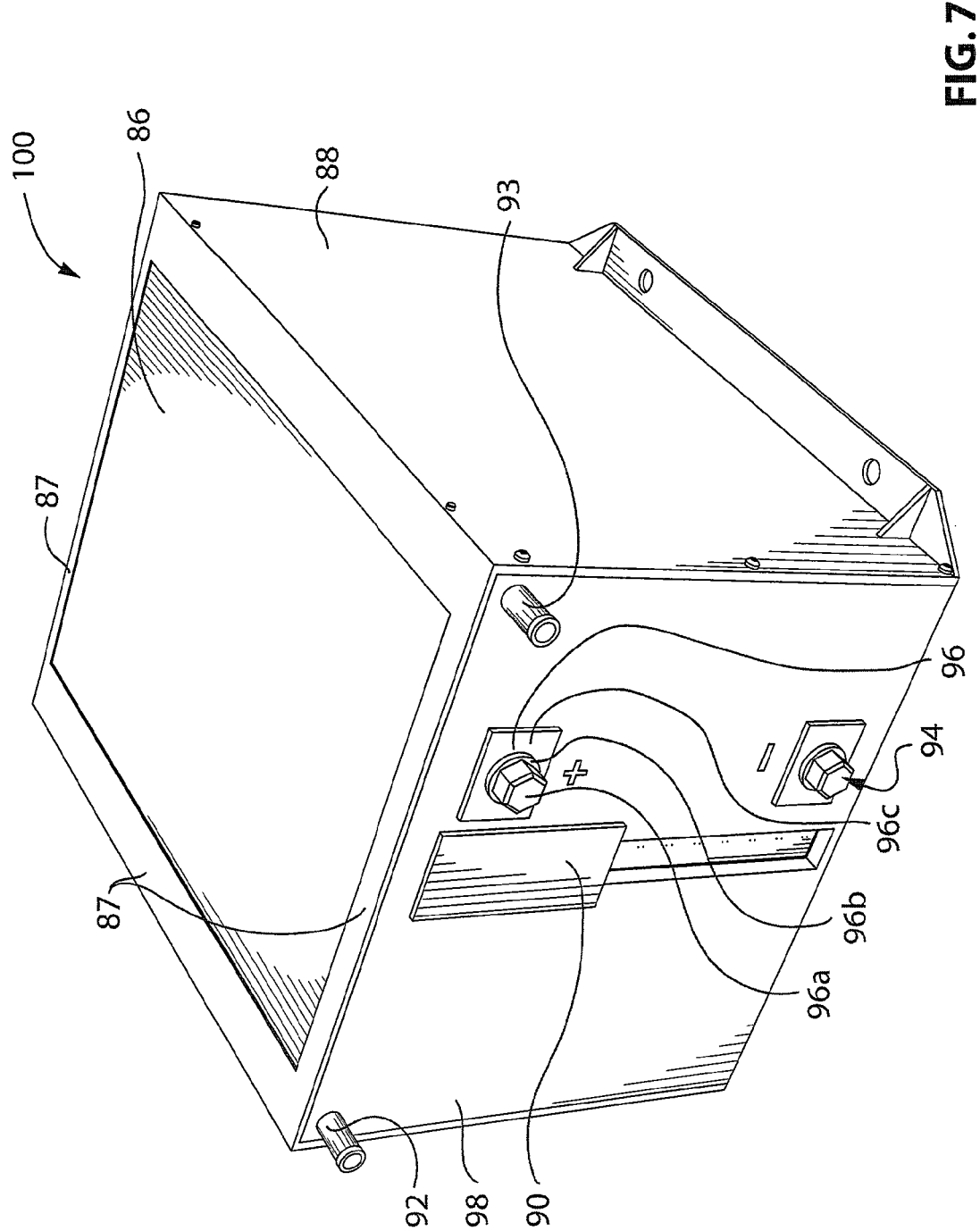
FIG. 7 is an axonometric view of a battery module according to the preferred embodiment, comprising the stack.

FIG. 7 shows a battery module 100 comprising the stack 50. The module 100 includes a face plate 98 that features a positive terminal 96 and a negative terminal 94. The terminals 94,96 are conventional automotive battery terminals in which a bolt or screw 96a is turned to pinch a wire (not shown) between a washer 96b and a conductive plate 96c. The module 100 also includes coolant inlet and outlet 92, 93 for the circulation of a coolant flowing within a water jacket 88. The module 100 also includes a printed circuit board (PCB) 90 that interfaces with the stack 50, as discussed in greater detail below.

Figure 8:
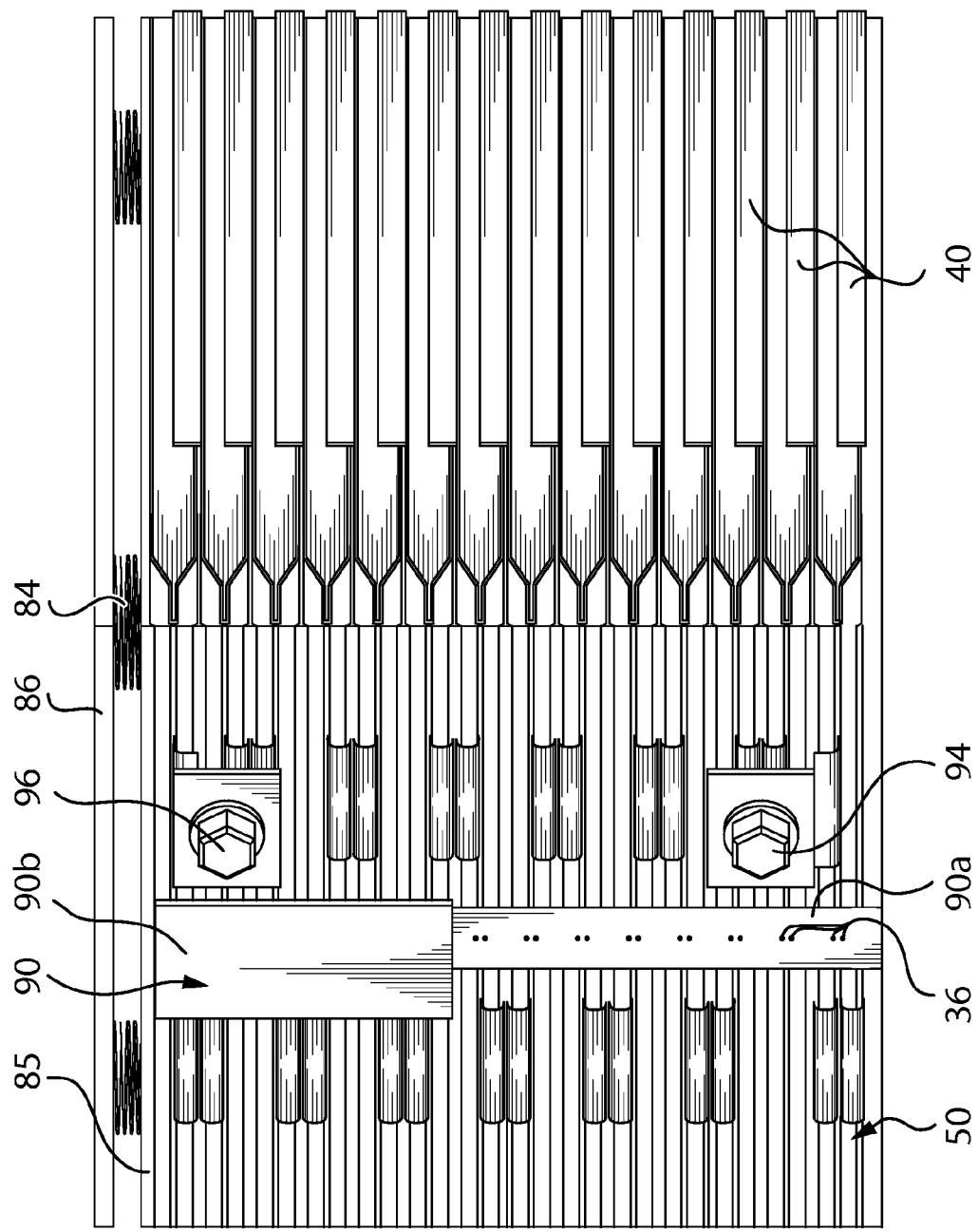
FIG. 8 is a fragmentary axonometric view of the battery module, showing the stack with additional electrical interface components installed thereon.

FIG. 8 shows a fragmentary view of the module 100, with most of the walls and casing 88 removed from view. As seen in FIG. 8, the module 100 includes a first plate 85 that is disposed over the top-most cell assembly 20Z in the stack 50. A second plate 86 is mounted over the first plate 85 via a series of springs 84. The second plate 86 abuts a frame 87 (FIG. 7) formed at the top of the water jacket 88, keeping the plates 85, 86 installed in the module 100. The spring loaded plate 86 inhibits the separation of individual cell assemblies 20 due to road vibrations and jerkiness experienced by the vehicle, whilst enabling the stack 50 to expand and contract with changes in temperature.

The PCB 90 is mounted to the stack 50 via the pins 36 exposed at the projections 37 of each interconnect 21. The PCB preferably includes two components, a first linear board 90a which includes mounting sockets for connecting the pins 36, and a second board 90b which is mounted in piggy-back fashion to the first board 90a. The second board 90 is spaced from the first board 90a at a sufficient distance to allow the second board to be flush with the surface of the face plate 98.

Figure 9:
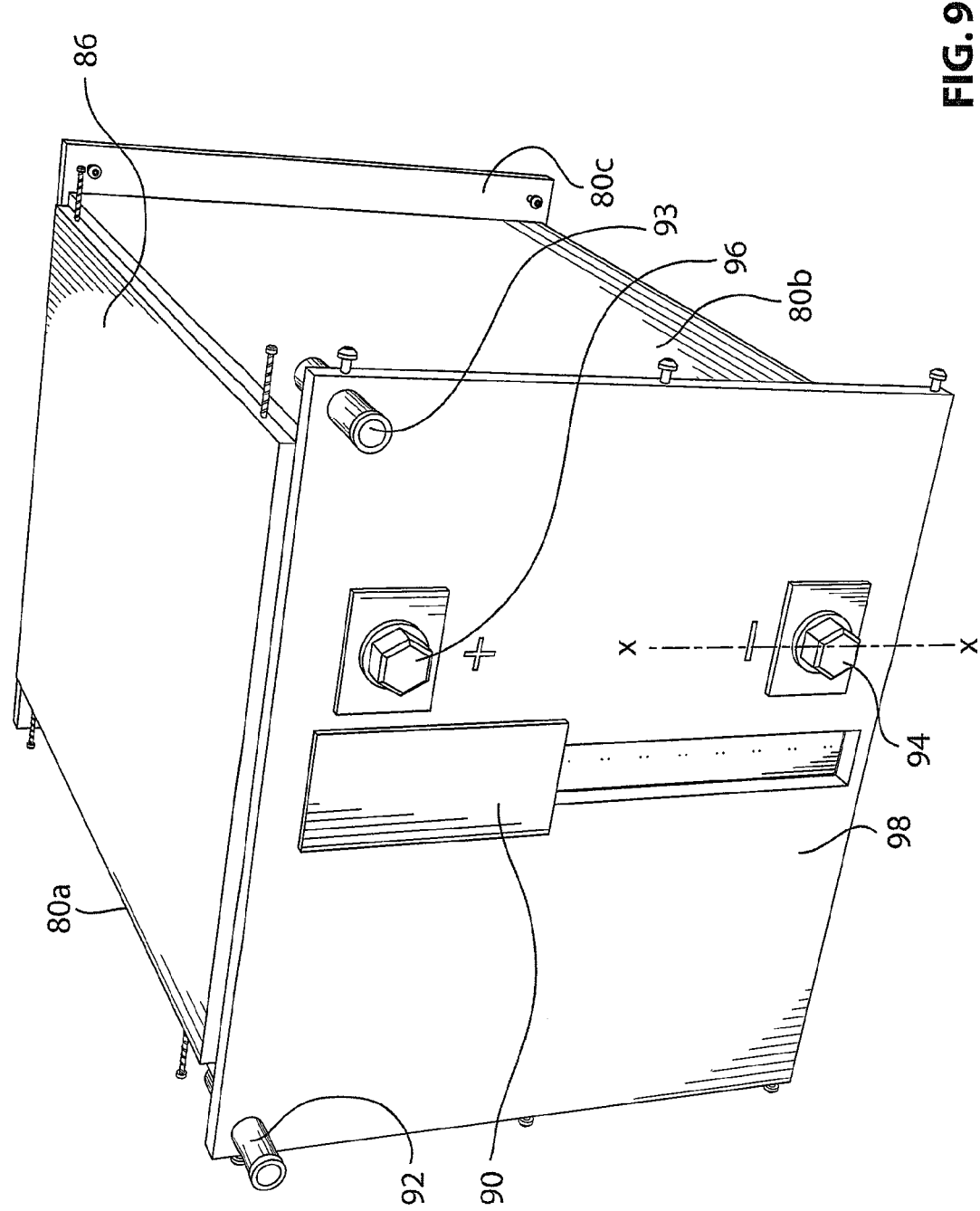
FIG. 9 is a fragmentary axonometric view of the battery module.

FIG. 9 shows another fragmentary view of the module 100 including internal walls of the water jacket 88 but with the outside walls thereof removed from view. As will be seen in FIG. 9, the water jacket 88 includes left and right internal sidewalls 80a, 80b, internal rear wall 80c, and an internal bottom wall 80d. These walls 80a-d are joined together and preferably form an integral part of the water jacket 88, which resembles an open box less top and front, and thus provides coolant-holding chambers on the bottom, sides and rear of the module 100. In order to maximize heat dissipation, the internal sidewalls 80a, 80b and internal rear wall 80c of the water jacket 88 abut the sidewalls of the trays 40 incorporated in the stack 50 to provide a heat conduction path to the cooling chambers. If desired, heat conductive grease may be applied between the sidewalls of the trays and the internal walls 80a, 80b, and 80c to ensure good thermal contact and minimize friction against the water jacket 88 as the stack 50 contracts and expands.

Figure 10:
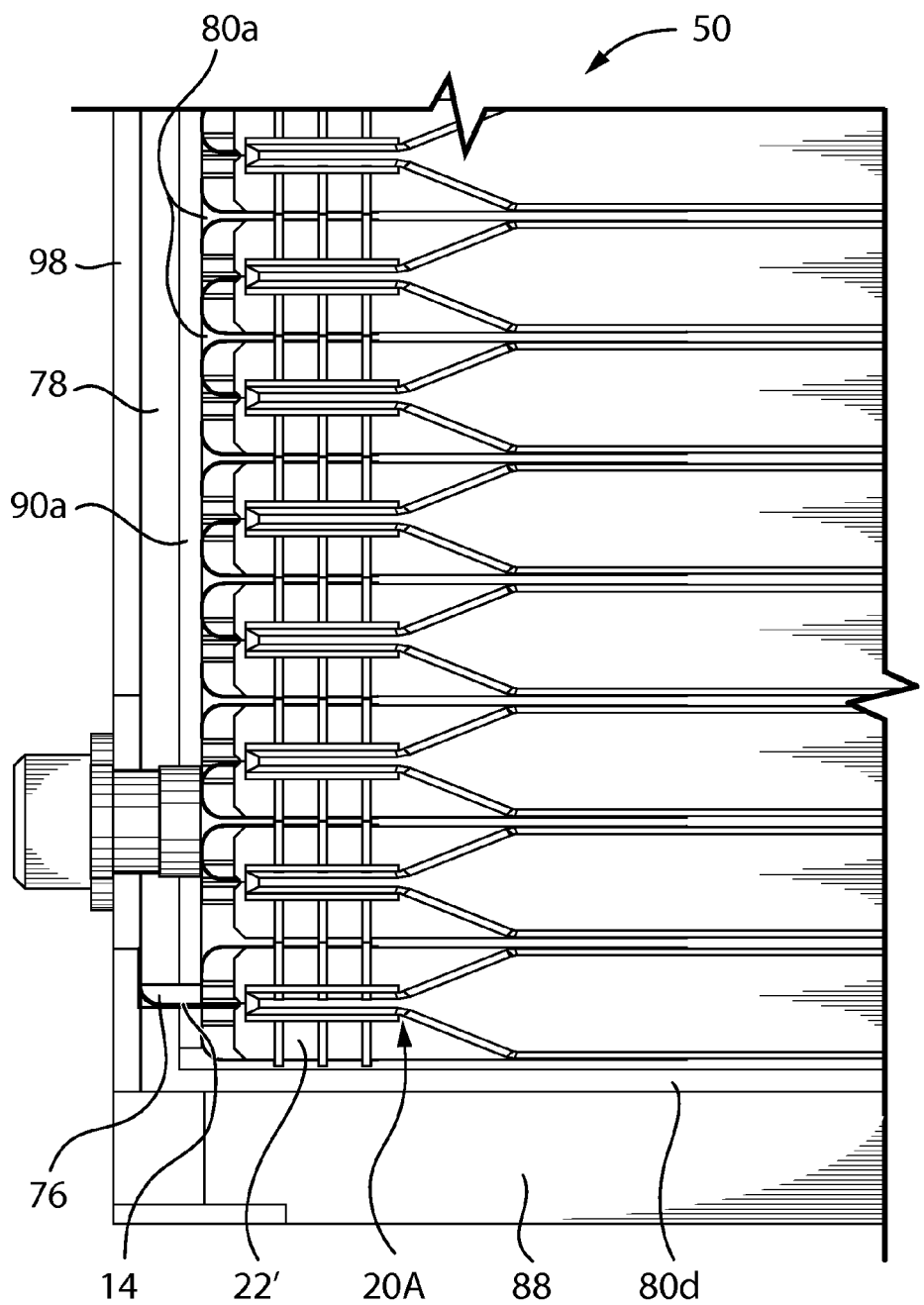
FIG. 10 is a detail cross-sectional view of the battery module taken along line X-X in FIG. 9.

Referring additionally to the detail cross-sectional view of FIG. 10, the module 100 also includes a front wall 78 disposed in the front opening of the water jacket 88 and connected thereto. This illustration also shows how the stack 50 is connected to the negative terminal 94. More particularly, the tab 14 of the lowermost cell assembly 20A is not folded onto connector 22', but instead is threaded through a slot 76 in the front wall 78 and sandwiched between the conductive plate 96c and the front wall 78. A similar connection is formed for the positive terminal 96 and tab 16 of the uppermost cell assembly 20Z.

While the above description constitutes a plurality of embodiments of the present invention, it will be appreciated that the present invention is susceptible to further modification and change without departing from the fair meaning of the accompanying claims.

The invention claimed is:

1. A battery module, comprising:
   a housing;
   a stack of cell assemblies disposed in the housing, wherein each cell assembly includes:
   a battery cell having positive and negative terminals and a flexible packaging, the packaging including a fringe area where the packaging is sealed, the fringe area having a first side and an opposing second side, the positive and negative terminals being in the form of flexible tabs emanating from the fringe area between the first and second sides thereof; and
   an interconnect device including a non-electrically conductive substrate disposed about the fringe area, the substrate incorporating a first conductive trace adjacent the first side of the flexible packaging and a second conductive trace adjacent the second side of the flexible packaging, wherein the first conductive trace terminates in a first array of pins projecting from the substrate away from the first side of the flexible packaging and the second conductive trace terminates in a second array of pins projecting from the substrate away from the second side of the flexible packaging, and wherein the substrate includes at least one opening for passage of the tabs therethrough;
   wherein the positive tab is embedded in one of the first and second pin arrays and the negative tab is embedded in the other of the first and second pin arrays;
   the cell assemblies being serially connected together such that the positive tab from a given cell assembly in the midst of the stack of cell assemblies electrically contacts the negative tab of a first neighboring cell assembly and the negative tab from the given cell assembly electrically contacts the positive tab of a second neighboring cell assembly; and
   terminals mounted on the housing, the terminals being respectively electrically connected to at least one positive tab and one negative tab in the stack of cell assemblies.

2. The module according to claim 1, wherein the housing includes at least one coolant chamber and an inlet and outlet thereto for circulation of coolant.

3. The module according to claim 2, wherein the stack of cell assemblies includes heat conductive bodies inserted in between the cell assemblies, the heat conductive bodies contacting the housing.

4. The module according to claim 3, wherein the heat conductive bodies are trays, wherein each tray has three sidewalls and each cell assembly is seated in one of the trays.

5. The module according to claim 4, wherein the housing has a plurality of walls, wherein each wall in part defines a coolant-holding chamber and abuts an associated one of the sidewalls of each tray.

6. The module according to claim 1, including a spring loaded plate mounted in the housing to compress the stack of cell assemblies, the stack of cell assemblies being expandable in the housing by applying pressure of expansion against the plate.

7. A The module according to claim 1, wherein in each interconnect the pins of the first array and the pins of the second array are offset from each other.

8. The module according to claim 1, wherein each interconnect includes two additional pins projecting from a face thereof that is visible in the stack of cell assemblies, the pins being respectively electrically connected to the first and second interconnect traces.

9. The module according to claim 8, including a printed circuit board attached to the additional pins.

10. The module according to claim 1, wherein the first conductive trace also terminates in a third array of pins projecting from the substrate away from the first side of the flexible packaging and the second conductive trace also terminates in a fourth array of pins projecting from the substrate away from the second side of the flexible packaging, the positive tab of the given cell assembly being connected to one of: (i) either the first or third pin arrays, and (ii) either of the second or fourth pin arrays, the negative tab being connected to the other of (i) and (ii).

11. The module according to claim 1, wherein the substrate of each interconnect sandwiches the fringe area of each cell packaging.

12. The module according to claim 11, wherein the substrate surrounds the fringe area of the packaging.

13. A battery cell assembly, comprising:
a battery cell having positive and negative terminals and a flexible packaging, the packaging including a fringe area where the packaging is sealed, the fringe area having a first side and an opposing second side, the positive and negative terminals being in the form of flexible tabs emanating from the fringe area between the first and second sides thereof; and
an interconnect device including a non-electrically conductive substrate disposed about the fringe area, the substrate incorporating a first conductive trace adjacent the first side of the flexible packaging and a second conductive trace adjacent the second side of the flexible packaging, wherein the first conductive trace terminates in a first array of pins projecting from the substrate away from the first side of the flexible packaging and the second conductive trace terminates in a second array of pins projecting from the substrate away from the second side of the flexible packaging, and wherein the substrate includes at least one opening for passage of the tabs therethrough;
wherein the positive tab is embedded in one of the first and second pin arrays and the negative tab is embedded in the other of the first and second pin arrays.

14. The battery cell assembly according to claim 13, wherein the substrate sandwiches the fringe area of the packaging.

15. The battery cell assembly according to claim 14, wherein the substrate substantially surrounds the fringe area of the packaging.

16. The battery cell assembly according to claim 13, wherein the pins in the first array and the pins in the second array are offset from each other.

17. The battery cell assembly according to claim 13, wherein the first conductive trace also terminates in a third array of pins projecting from the substrate away from the first side of the flexible packaging and the second conductive trace also terminates in a fourth array of pins projecting from the substrate away from the second side of the flexible packaging.

* * * * *